(12) United States Patent
Zhang et al.

(10) Patent No.: US 12,506,229 B2
(45) Date of Patent: Dec. 23, 2025

(54) BATTERY AND ELECTRIC APPARATUS HAVING SAME

(71) Applicant: Ningde Amperex Technology Limited, Ningde (CN)

(72) Inventors: Guowen Zhang, Ningde (CN); Wu Ma, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 526 days.

(21) Appl. No.: 17/986,118

(22) Filed: Nov. 14, 2022

(65) Prior Publication Data
US 2023/0075107 A1 Mar. 9, 2023

Related U.S. Application Data

(63) Continuation of application No. PCT/CN2020/090374, filed on May 14, 2020.

(51) Int. Cl.
*H01M 10/0587* (2010.01)
*H01M 50/533* (2021.01)
(Continued)

(52) U.S. Cl.
CPC ..... *H01M 50/533* (2021.01); *H01M 10/0587* (2013.01); *H01M 50/538* (2021.01); *H01M 50/107* (2021.01)

(58) Field of Classification Search
CPC ........... H01M 10/0587; H01M 50/533; H01M 50/538
See application file for complete search history.

(56) References Cited

U.S. PATENT DOCUMENTS

| | | | | |
|---|---|---|---|---|
| 2012/0040238 A1* | 2/2012 | Wu | ............ | H01M 10/0587 429/161 |
| 2013/0164582 A1* | 6/2013 | Humphrys | ........ | H01M 10/0587 219/121.64 |
| 2013/0344364 A1* | 12/2013 | Nanaumi | ............ | H01M 4/13 429/94 |

FOREIGN PATENT DOCUMENTS

| CN | 102823053 A | 12/2012 |
|---|---|---|
| CN | 206471426 U | 9/2017 |

(Continued)

OTHER PUBLICATIONS

Clarivate Analytics machine translation of JP 2007-294111 A (Year: 2007).*

(Continued)

*Primary Examiner* — Kevin E Yoon
(74) *Attorney, Agent, or Firm* — WHDA, LLP

(57) ABSTRACT

A battery includes a housing and a battery cell accommodated in the housing. The housing includes a first housing body and a second housing body fitting with the first housing body. The battery cell includes a first electrode plate and a second electrode plate wound around a hollow cell winding space to form the battery cell. The battery further includes a conductive structure accommodated in the cell winding space, where the conductive structure includes a first conductive part and a second conductive part electrically isolated from each other. The first conductive part is connected with the first electrode plate and in electrical communication with the first housing body; and the second conductive part is connected with the second electrode plate and in electrical communication with the second housing body. The first housing body and the second housing body are electrically isolated from each other.

17 Claims, 4 Drawing Sheets

(51) Int. Cl.
    *H01M 50/538*    (2021.01)
    *H01M 50/107*    (2021.01)

(56) References Cited

FOREIGN PATENT DOCUMENTS

| | | | |
|---|---|---|---|
| CN | 207233890 U | | 4/2018 |
| CN | 108448060 A | | 8/2018 |
| CN | 110299249 A | | 10/2019 |
| CN | 110752401 A | | 2/2020 |
| JP | 2007-294111 A | | 11/2007 |
| JP | 2011238569 A | * | 11/2011 |
| JP | 2017059442 A | * | 3/2017 |

OTHER PUBLICATIONS

International Search Report dated Feb. 19, 2021, issued in counterpart International Application No. PCT/CN2020/090374, with English Translation. (7 pages).

* cited by examiner

BATTERY AND ELECTRIC APPARATUS HAVING SAME

CROSS REFERENCE TO THE RELATED APPLICATIONS

This application is a continuation under 35 U.S.C. § 120 of international patent application PCT/CN2020/090374 filed on May 14, 2020, the entire contents of which are incorporated herein by reference.

TECHNICAL FIELD

This application relates to a battery and an electric apparatus with such battery.

BACKGROUND

Currently, battery structures are mainly categorized into wound structures or laminated structures. Considering that laminated batteries have complex production process, low yield rate, and high cost, most batteries are the wound structure. For common batteries of the wound structure, a positive electrode plate, a negative electrode plate, and two separators need to be stacked into a four-layer structure, and then wound around a winding needle. After the winding, the winding needle needs to be drawn out to obtain a battery cell.

However, when the winding needle is drawn out, the separator at the inner layer of the battery cell is pulled out or dislocated, which leads to short circuit caused by contact between the positive electrode plate and the negative electrode plate on two sides, thereby leading to safety hazards. In addition, the battery cell becomes hollow after the drawing out of the winding needle. If the center of a battery housing sinks due to external force, the internal electrode plates are likely to deform, which affects quality of the battery cell.

SUMMARY

In view of this, it is necessary to provide a battery having a battery cell with improved safety and quality.

In addition, it is further necessary to provide an electric apparatus with such battery.

This application provides a battery including a housing and a battery cell accommodated in the housing. The housing includes a first housing body and a second housing body fitting with the first housing body. The battery cell includes a first electrode plate and a second electrode plate. The first electrode plate and the second electrode plate are wound around a hollow cell winding space to form the battery cell. The battery further includes a conductive structure accommodated in the cell winding space, where the conductive structure includes a first conductive part and a second conductive part electrically isolated from each other. The first conductive part is connected with the first electrode plate and in electrical communication with the first housing body; and the second conductive part is connected with the second electrode plate and in electrical communication with the second housing body. The first housing body and the second housing body are electrically isolated from each other.

In some embodiments of this application, in a direction of a winding axis of the battery cell, the first conductive part and the second conductive part are stacked in the cell winding space; and a first insulation layer is sandwiched between the first conductive part and the second conductive part.

In some embodiments of this application, the first electrode plate includes a first current collector and a first active material layer disposed on the first current collector; and in a length direction, the first current collector includes a first portion and a second portion connected with the first portion, where the first portion is a blank region uncoated with the first active material layer, and the first portion is located at an inner ring of the battery cell and connected with the first conductive part.

In some embodiments of this application, the second electrode plate includes a second current collector and a second active material layer disposed on the second current collector; and in the length direction, the second current collector includes a third portion and a fourth portion connected with the second portion, where the third portion is a blank region uncoated with the second active material layer, and the third portion is located at the inner ring of the battery cell and connected with the second conductive part.

In some embodiments of this application, in a width direction of the first current collector, width of the first portion is less than width of the second portion, and width of the third portion is less than width of the fourth portion.

In some embodiments of this application, in a direction perpendicular to a winding axis of the battery cell, the first conductive part and the second conductive part are disposed side by side in the cell winding space; and a first insulation layer is sandwiched between the first conductive part and the second conductive part.

In some embodiments of this application, height of the conductive structure is greater than height of the battery cell, so that a gap is formed between the battery cell and the first housing body and/or between the battery cell and the second housing body, and a second insulation layer is disposed in the gap.

In some embodiments of this application, the first conductive part includes a first conductive body and a first flange disposed on outer circumference of an end of the first conductive body; the second conductive part includes a second conductive body and a second flange disposed on outer circumference of an end of the second conductive body; and the second insulation layer is sandwiched between the first flange and the battery cell and/or between the second flange and the battery cell.

In some embodiments of this application, cross sections of the first conductive part and the second conductive part are circular, rectangular, elliptical, triangular, or polygonal.

This application further provides an electric apparatus, where the electric apparatus includes the foregoing battery.

In this application, the conductive structure is disposed in the cell winding space. During preparation, the first electrode plate and the second electrode plate may be wound around the conductive structure. Therefore, the conductive structure can replace a winding needle in the prior art, and the conductive structure does not need to be drawn out after the battery cell is formed through winding, avoiding the problem in the prior art that a separator is pulled out or dislocated due to the drawing out of the winding needle, which avoids short circuit and improves safety. Moreover, since the conductive structure after the winding does not need to be drawn out, the conductive structure can provide support when the center of the housing sinks and deforms, preventing the first electrode plate and the second electrode plate inside the housing from deforming due to the effect of the housing, thereby improving quality of the battery cell. In addition, the conductive structure includes the first conductive part and the second conductive part electrically isolated from each other. The first conductive part is connected with the first electrode plate and in electrical communication with the first housing body; and the second conductive part is connected with the second electrode plate and in electrical communication with the second housing body, so as to implement electrical connection between the electrode plates and the housing bodies.

REFERENCE SIGNS OF MAIN COMPONENTS

Figure 1:
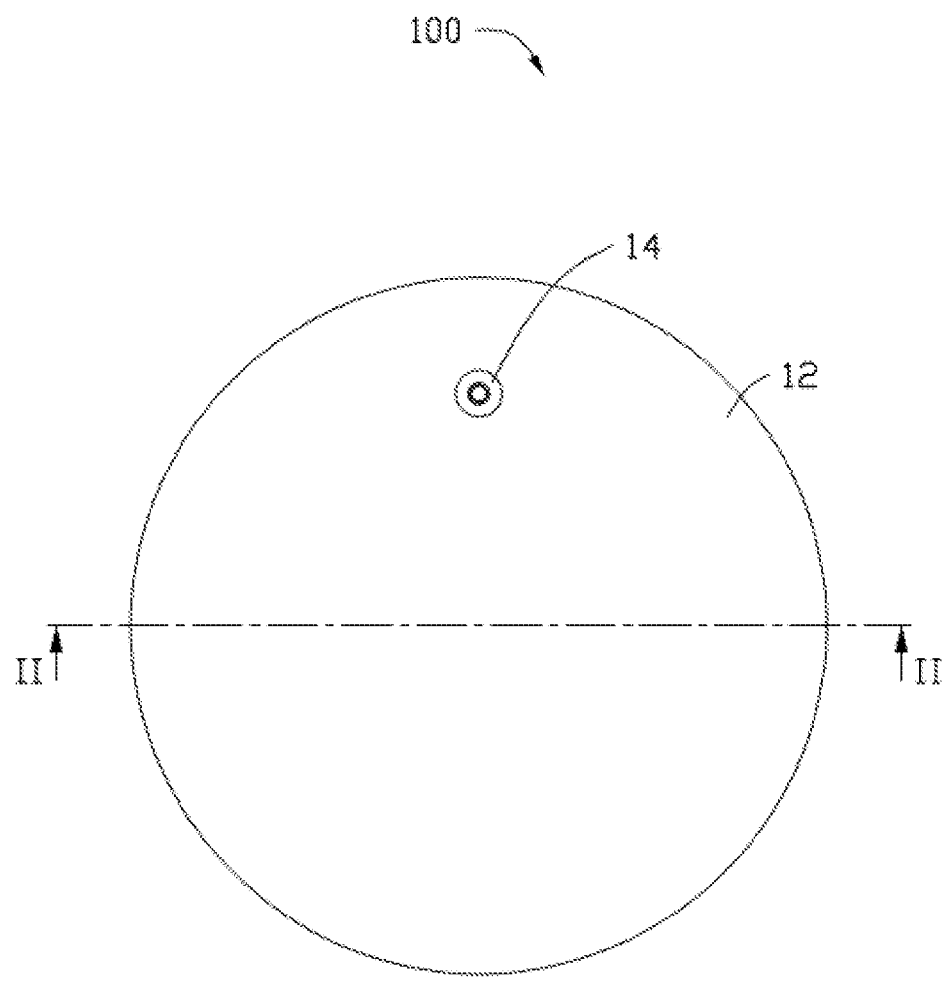
FIG. 1 is a top view of a battery according to an embodiment of this application.

Housing 10
First housing body 11
Second housing body 12
Adhesive layer 13
Injection plug 14
Battery cell 20
First electrode plate 21
Second electrode plate 22
Cell winding space 23
Separator 24
Conductive structure 30
First conductive part 31
Second conductive part 32
First insulation layer 33
Second insulation layer 40
Battery 100
Accommodating space 110
First current collector 210
First active material layer 211
Second current collector 220
Second active material layer 221
First conductive body 310
First flange 311
Second conductive body 320
Second flange 321
First portion 2101
Second portion 2102
Third portion 2201
Fourth portion 2202
Widths $W_1$, $W_2$, $W_3$, $W_4$
Heights $H_1$, $H_2$ This application will be further described with reference to the accompanying drawings in the following specific embodiments.

DETAILED DESCRIPTION

The following clearly and completely describes the technical solutions in embodiments of this application with reference to the accompanying drawings in the embodiments of this application. Apparently, the described embodiments are some but not all embodiments of this application. All other embodiments obtained by a person of ordinary skill in the art based on the embodiments of this application without creative efforts shall fall within the protection scope of this application.

Unless otherwise defined, all technical and scientific terms used herein shall have the same meanings as commonly understood by those skilled in the art to which this application belongs. The terms used herein in the specification of this application are intended to merely describe the specific embodiments rather than limit this application.

The following describes in detail some embodiments of this application with reference to the accompanying drawings. Without conflict, the following embodiments and features in the embodiments in this application may be combined with each other.

Figure 2:
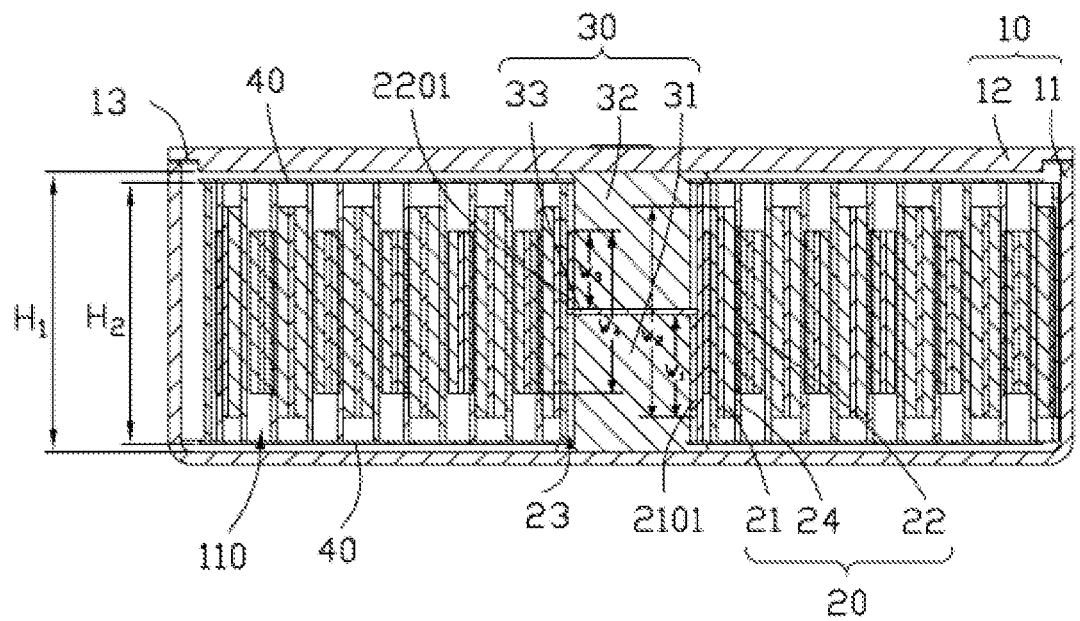
FIG. 2 is an II-II cross-sectional view of the battery in FIG. 1.

Referring to FIG. 1 and FIG. 2, an embodiment of this application provides a battery 100, including a housing 10 and a battery cell 20 accommodated in the housing 10. The housing 10 includes a first housing body 11 and a second housing body 12 fitting with the first housing body 11. The battery cell 20 includes a first electrode plate 21, a second electrode plate 22, and a separator 24 sandwiched between the first electrode plate 21 and the second electrode plate 22, where the first electrode plate 21, the separator 24, and the second electrode plate 22 are wound around a hollow cell winding space 23 to form the battery cell 20.

The battery 100 further includes a conductive structure 30 accommodated in the cell winding space 23, where the conductive structure 30 includes a first conductive part 31 and a second conductive part 32 electrically isolated from each other, and a first insulation layer 33 sandwiched between the first conductive part 31 and the second conductive part 32, and the first conductive part 31 and the second conductive part 32 are electrically isolated through the first insulation layer 33. The first conductive part 31 is connected with the first electrode plate 21 and in electrical communication with the first housing body 11; and the second conductive part 32 is connected with the second electrode plate 22 and in electrical communication with the second housing body 12. The first housing body 11 and the second housing body 12 are electrically isolated from each other.

In this application, the conductive structure 30 is disposed in the cell winding space 23. During preparation, the first electrode plate 21, the separator 24, and the second electrode plate 22 are wound around the conductive structure 30. Therefore, the conductive structure 30 can replace a winding needle in the prior art, and the conductive structure 30 does not need to be drawn out after the battery cell 20 is formed through winding, avoiding the problem in the prior art that the separator is pulled out or dislocated due to the drawing out of the winding needle, which avoids short circuit and improves safety. Moreover, since the conductive structure 30 after the winding does not need to be drawn out, the conductive structure 30 can provide support when the center of the housing 10 sinks and deforms, preventing the first electrode plate 21 and the second electrode plate 22 inside the housing 10 from deforming due to the effect of the housing 10, thereby improving quality of the battery cell 20. Furthermore, since the first conductive part 31 is connected with the first electrode plate 21 and in electrical communication with the first housing body 11, the first housing body 11 can deliver the same polarity as the first electrode plate 21. Since the second conductive part 32 is connected with the second electrode plate 22 and in electrical communication with the second housing body 12, the second housing body 12 can deliver the same polarity as the second electrode plate 22. Therefore, electrical connection between the electrode plates and the housing bodies can be implemented, so that the polarities of the first electrode plate 21 and the second electrode plate 22 can be led out respectively through the first housing body 11 and the second housing body 12.

As shown in FIG. 2, in this embodiment, the first conductive part 31 is sandwiched between the first housing body 11 and the second housing body 12, and the second conductive part 32 is sandwiched between the first conductive part 31 and the second housing body 12. In other words, in a direction of a winding axis of the battery cell 20, the first conductive part 31 and the second conductive part 32 are stacked in the cell winding space 23.

Figure 3:
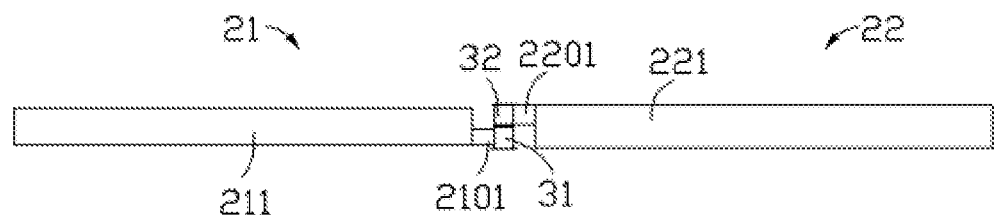
FIG. 3 is a schematic diagram of a first electrode plate and a second electrode plate of the battery in FIG. 2 being wound around a conductive structure.
Figure 4:
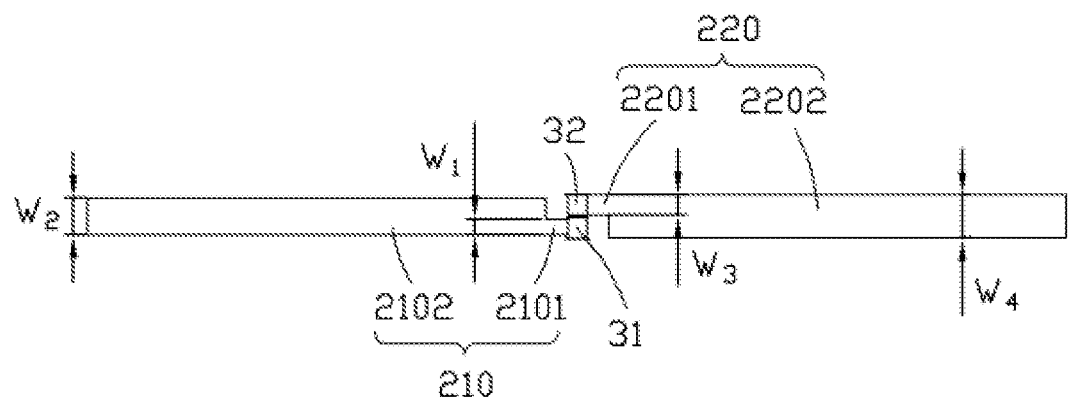
FIG. 4 is a schematic diagram of the first electrode plate and the second electrode plate in FIG. 3 with a first active material layer and a second active material layer removed.

Referring to FIG. 3 and FIG. 4, further, the first electrode plate 21 includes a first current collector 210 and a first active material layer 211 disposed on the first current collector 210; and in a length direction, the first current collector 210 includes a first portion 2101 and a second portion 2102 connected with the first portion 2101, where the first portion 2101 is a blank region uncoated with the first active material layer 211. The first portion 2101 is located at an inner ring of the battery cell 20 and connected with the first conductive part 31. To be specific, the first portion 2101 may be used as a tab of the first electrode plate 21, and the first conductive part 31 is connected with the first electrode plate 21 through the first portion 2101. Therefore, the polarity of the first electrode plate 21 can be led out to the first conductive part 31 through the tab of the first electrode plate 21, so that the first conductive part 31 and the first electrode plate 21 deliver a same polarity. The first electrode plate 21 may be a negative electrode plate, that is, the first housing body 11 as a whole can deliver a negative electrode polarity. The length direction is an extension direction of the battery cell 20 formed by winding the first electrode plate 21.

The second electrode plate 22 includes a second current collector 220 and a second active material layer 221 disposed on the second current collector 220; and in the length direction, the second current collector 220 includes a third portion 2201 and a fourth portion 2202 connected with the second portion 2102, where the third portion 2201 is a blank region uncoated with the second active material layer 221, and the third portion 2201 is located at the inner ring of the battery cell 20 and connected with the second conductive part 32. To be specific, the third portion 2201 may be used as a tab of the second electrode plate 22. The second conductive part 32 is connected with the second electrode plate 22 through the third portion 2201. Therefore, the polarity of the second electrode plate 22 can be led out to the second conductive part 32 through the tab of the second electrode plate 22, so that the second conductive part 32 and the second electrode plate 22 deliver a same polarity. The second electrode plate 22 may be a positive electrode plate, that is, the second housing body 12 as a whole can deliver a positive electrode polarity. The length direction is an extension direction of the battery cell 20 formed by winding the second electrode plate 22.

During preparation, the first electrode plate 21 is connected with the first conductive part 31 through the first portion 2101, and the second electrode plate 22 is connected with the second conductive part 32 through the third portion 2201. Then, the first electrode plate 21, the separator 24, and the second electrode plate 22 are wound around the conductive structure 30 along a same direction to form the battery cell 20, and the first portion 2101 and the third portion 2201 are located at the inner ring of the battery cell 20.

As shown in FIG. 4, further, in a width direction of the first current collector 210, width $W_1$ of the first portion 2101 is less than width $W_2$ of the second portion 2102, and width $W_3$ of the third portion 2201 is less than width $W_4$ of the fourth portion 2202. Still further, the width $W_1$ of the first portion 2101 is not greater than height of the first conductive part 31, and the width $W_3$ of the third portion 2201 is not greater than height of the second conductive part 32. Since the width $W_1$ of the first portion 2101 and the width $W_3$ of the third portion 2201 are relatively small, the first portion 2101 and the third portion 2201 can be respectively configured for being wound around outer circumferences of the first conductive part 31 and the second conductive part 32 when the innermost ring of the battery cell 20 is formed through winding, avoiding contact between the first current collector 210 and the second conductive part 32 and contact between the second current collector 220 and the first conductive part 31, so as to avoid short circuit.

As shown in FIG. 2, in this embodiment, the height $H_1$ of the conductive structure 30 is greater than the height $H_2$ of the battery cell 20. In this way, the conductive structure 30 can better provide support, thereby preventing the first electrode plate 21 and the second electrode plate 22 inside the housing 10 from deforming due to the deformation of the housing 10. In the direction of the winding axis of the battery cell 20, width of the separator 24 is greater than both the width of the first electrode plate 21 and the width of the second electrode plate 22, and hence the height $H_2$ of the battery cell 20 is equal to the width of the separator 24.

Further, the height $H_1$ of the conductive structure 30 is greater than the height $H_2$ of the battery cell 20, so that a gap is formed between the battery cell 20 and the first housing body 11 and/or between the battery cell 20 and the second housing body 12, and a second insulation layer 40 is disposed in the gap. The second insulation layer 40 is configured to prevent direct contact between the first electrode plate 21 and the second housing body 12, and/or prevent direct contact between the second electrode plate 22 and the first housing body 11, thereby avoiding short circuit. As shown in FIG. 2, in this embodiment, the second insulation layer 40 is provided in a quantity of two. One is sandwiched between the battery cell 20 and the first housing body 11. The other is sandwiched between the battery cell 20 and the second housing body 12.

The second insulation layer 40 may be made of at least one of polymer materials including polypropylene (PP), polyurethane (PU), polystyrene (PS), polyethylene (PE), polyimide (PI), polyester (PET), propylene carbonate (PC), polyvinyl chloride (PVC), or polyamide (PA). The second insulation layer 40 may be a single-layer structure or a multi-layer composite structure.

Figure 5:
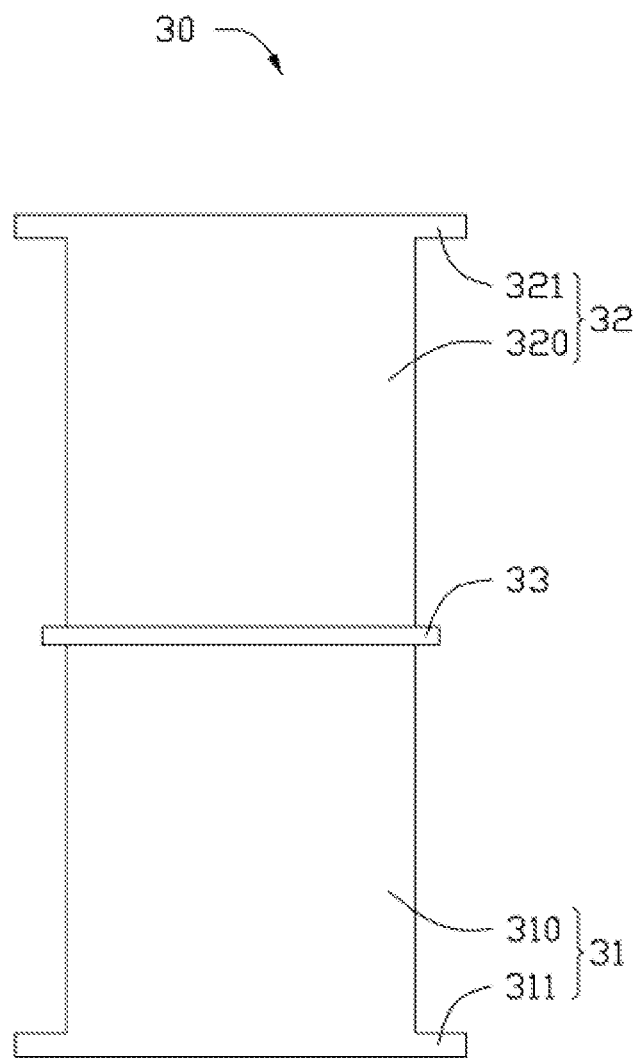
FIG. 5 is a schematic diagram of a conductive structure of the battery in FIG. 2.

Referring to FIG. 5, further, the first conductive part 31 includes a first conductive body 310 and a first flange 311 disposed on outer circumference of an end of the first conductive body 310; the second conductive part 32 includes a second conductive body 320 and a second flange 321 disposed on outer circumference of an end of the second conductive body 320; and the second insulation layer 40 is sandwiched between the first flange 311 and the battery cell 20 and/or between the second flange 321 and the battery cell 20. Therefore, the first flange 311 and the second flange 321 can be configured to limit position of the second insulation layer 40, thereby preventing the second insulation layer 40 from displacing in the gap.

As shown in FIG. 2 and FIG. 5, the height $H_1$ of the conductive structure 30 is the sum of heights of the first conductive part 31, the second conductive part 32, and the first insulation layer 33. The first insulation layer 33 may be made of at least one of polymer materials including polypropylene, polyurethane, polystyrene, polyethylene, polyimide, polyester, propylene carbonate, polyvinyl chloride, or polyamide. The first conductive part 31, the second conductive part 32, and the first insulation layer 33 may be connected into an integrated structure through an adhesive, heat sealing, welding, or other ways.

The first conductive part 31 and the second conductive part 32 may be made of conductive materials such as steel alloy, aluminum alloy, iron alloy, copper alloy, or nickel alloy. Width of the first conductive part 31 is less than 1000 mm and the height of the first conductive part 31 is less than 1000 mm. Cross sections of the first conductive part 31, the second conductive part 32, and the first insulation layer 33 are circular, rectangular, elliptical, triangular, or polygonal.

As shown in FIG. 2, in this embodiment, the first housing body 11 is provided with an accommodating space 110 for accommodating the battery cell 20, and the second housing body 12 is mounted on the first housing body 11 to enclose the accommodating space 110. In other words, the second housing body 12 may be a top cover of the housing 10. The first housing body 11 and the second housing body 12 may be made of metal. For example, the first housing body 11 and the second housing body 12 may be made of steel alloy, aluminum alloy, iron alloy, copper alloy, nickel alloy, or the like. The first housing body 11 and the second housing body 12 are bonded through an adhesive layer 13, and the adhesive layer 13 is configured to electrically isolate the first housing body 11 from the second housing body 12.

In another embodiment, the first housing body 11 and the second housing body 12 may be sealed with an insulation sealing ring.

As shown in FIG. 1, the battery 100 in this embodiment is a button cell, and the first housing body 11 and the second housing body 12 are both made of stainless steel. During preparation, the first housing body 11 and the second housing body 12 may be made into required shapes by laser cutting, machine tool processing, or other processes. The first housing body 11 may alternatively be made into a scour hole (namely, the accommodating space 110) by stamping forming.

As shown in FIG. 1, the second housing body 12 is provided with an injection hole (not shown in the figure), and an electrolyte may be injected through the injection hole. An injection plug 14 is disposed in the injection hole and configured to seal the injection hole, thereby avoiding leakage of injected electrolyte or preventing external impurities from entering the inside of the battery 100. Certainly, the injection hole may alternatively be located in the first housing body 11.

Figure 6:
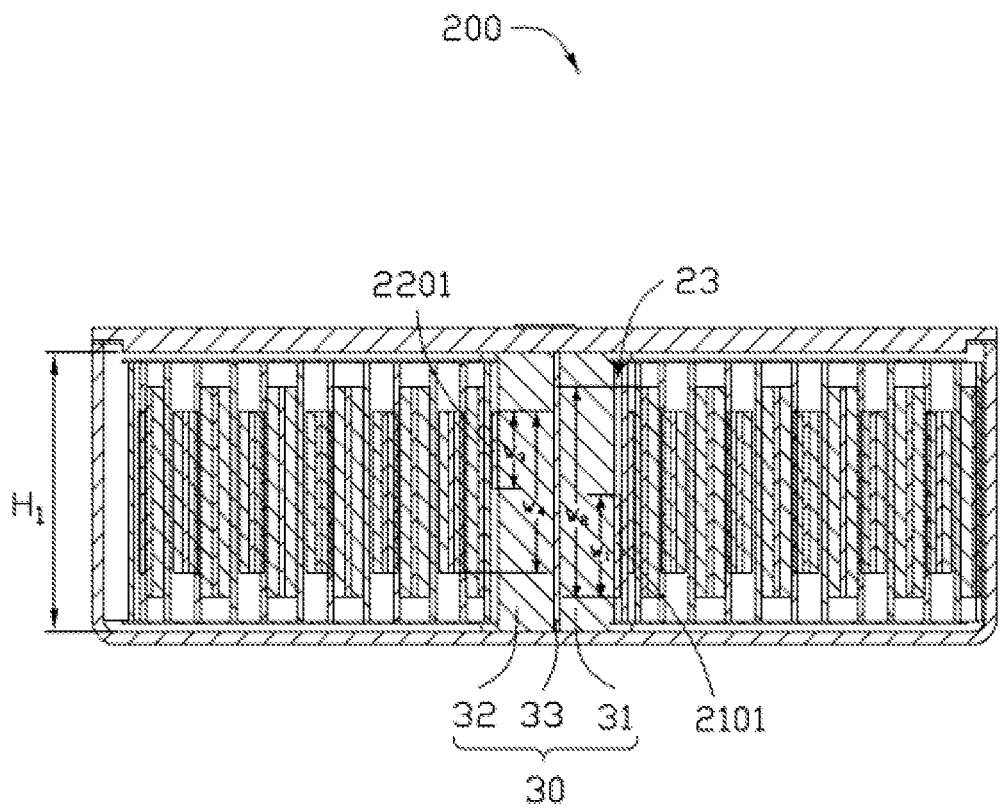
FIG. 6 is a cross-sectional view of a battery according to another embodiment of this application.

Referring to FIG. 6, another embodiment of this application further provides a battery 200. The battery 200 is similar to the battery 100 except that the first conductive part 31 and the second conductive part 32 of the battery 200 are disposed side by side in the cell winding space 23 along a direction perpendicular to the winding axis of the battery cell 20. Further, the first insulation layer 33 is sandwiched between the first conductive part 31 and the second conductive part 32, and an extension direction of the first insulation layer 33 is parallel to the winding axis of the battery cell 20.

The heights of the first conductive part 31 and the second conductive part 32 may be approximately the same. In this case, the height $H_1$ of the conductive structure 30 is equal to the height of the first conductive part 31 or the height of the second conductive part 32.

As shown in FIG. 6, in this embodiment, the width $W_1$ of the first portion 2101 is less than the width $W_2$ of the second portion 2102, and the width $W_3$ of the third portion 2201 is less than the width $W_4$ of the fourth portion 2202.

It can be understood that the width $W_1$ of the first portion 2101 may alternatively be equal to the width $W_2$ of the second portion 2102, and the width $W_3$ of the third portion 2201 may alternatively be equal to the width $W_4$ of the fourth portion 2202. This can also avoid short circuit caused by contact between the first current collector 210 and the second conductive part 32 or contact between the second current collector 220 and the second conductive part 32 when the innermost ring of the battery cell 20 is formed through winding. In this case, during preparation of the electrode plates, the first current collector 210 and the second current collector 220 do not need to be cut, thereby simplifying an electrode plate preparation process.

Figure 7:
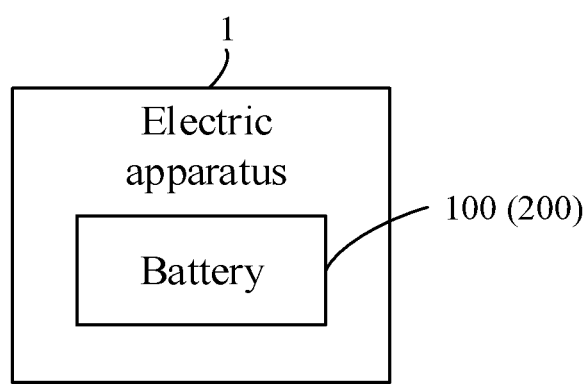
FIG. 7 is an architectural diagram of a module of an electric apparatus according to an embodiment of this application.

Referring to FIG. 7, this application further provides an electric apparatus 1, where the electric apparatus 1 includes the battery 100 or the battery 200 as described above. The electric apparatus 1 may be a consumer electronic product, such as a smart phone. It can be understood that in another embodiment, the electric apparatus 1 may alternatively be an electric tool, an energy storage apparatus, a power apparatus, or the like. For example, the electric apparatus 1 may alternatively be an electric vehicle.

The foregoing descriptions are merely preferable embodiments of this application, but are not intended to limit this application. Any modification, equivalent replacement, or improvement made without departing from the spirit and principle of this application shall fall within the protection scope of this application.

What is claimed is:

1. A battery, comprising a housing and a battery cell accommodated in the housing, wherein the housing comprises a first housing body and a second housing body fitting with the first housing body, the battery cell comprises a first electrode plate and a second electrode plate, and the first electrode plate and the second electrode plate are wound around a conductive structure provided in a hollow cell winding space to form the battery cell;

wherein the conductive structure comprises a first conductive part and a second conductive part electrically isolated from each other; and the first conductive part is connected with the first electrode plate and in electrical communication with the first housing body, the second conductive part is connected with the second electrode plate and in electrical communication with the second housing body, and the first housing body and the second housing body are electrically isolated from each other;

wherein the first electrode plate comprises a first current collector and a first active material layer disposed on the first current collector; and in a longitudinal direction of the first electrode plate, the first current collector comprises a first portion and a second portion directly connected with the first portion, wherein the first portion is a blank region uncoated with the first active material layer, and the first portion is located at an inner ring of the battery cell and connected with the first conductive part, and in a width direction of the first current collector, a width of the first portion is less than a width of the second portion.

2. The battery according to claim 1, wherein in a direction of a winding axis of the battery cell, the first conductive part and the second conductive part are stacked in the hollow cell winding space; and a first insulation layer is sandwiched between the first conductive part and the second conductive part.

3. The battery according to claim 2, wherein a height of the conductive structure is greater than a height of the battery cell, so that a gap is formed between the battery cell and the first housing body and/or between the battery cell and the second housing body, and a second insulation layer is disposed in the gap.

4. The battery according to claim 3, wherein the first conductive part comprises a first conductive body and a first flange disposed on an outer circumference of an end of the first conductive body; the second conductive part comprises a second conductive body and a second flange disposed on an outer circumference of an end of the second conductive body; and the second insulation layer is sandwiched between the first flange and the battery cell and/or between the second flange and the battery cell.

5. The battery according to claim 1, wherein the second electrode plate comprises a second current collector and a second active material layer disposed on the second current collector; and in the length direction, the second current collector comprises a third portion and a fourth portion connected with the second portion, wherein the third portion is a blank region uncoated with the second active material layer, and the third portion is located at the inner ring of the battery cell and connected with the second conductive part.

6. The battery according to claim 5, wherein in the width direction of the first current collector, a width of the third portion is less than a width of the fourth portion.

7. The battery according to claim 6, wherein in the width direction of the first current collector, the first portion and the third portion do not overlap.

8. The battery according to claim 1, wherein in a direction perpendicular to a winding axis of the battery cell, the first conductive part and the second conductive part are disposed side by side in the hollow cell winding space; and a first insulation layer is sandwiched between the first conductive part and the second conductive part.

9. The battery according to claim 1, wherein cross sections of the first conductive part and the second conductive part are circular, rectangular, elliptical, triangular, or polygonal.

10. An electric apparatus, wherein the electric apparatus comprises the battery according to claim 1.

11. The electric apparatus according to claim 10, wherein in a direction of a winding axis of the battery cell, the first conductive part and the second conductive part are stacked in the cell hollow winding space; and a first insulation layer is sandwiched between the first conductive part and the second conductive part.

12. The electric apparatus according to claim 11, wherein a height of the conductive structure is greater than a height of the battery cell, so that a gap is formed between the battery cell and the first housing body and/or between the battery cell and the second housing body, and a second insulation layer is disposed in the gap.

13. The electric apparatus according to claim 12, wherein the first conductive part comprises a first conductive body and a first flange disposed on an outer circumference of an end of the first conductive body; the second conductive part comprises a second conductive body and a second flange disposed on an outer circumference of an end of the second conductive body; and the second insulation layer is sandwiched between the first flange and the battery cell and/or between the second flange and the battery cell.

14. The electric apparatus according to claim 10, wherein the second electrode plate comprises a second current collector and a second active material layer disposed on the second current collector; and in the length direction, the second current collector comprises a third portion and a fourth portion connected with the second portion, wherein the third portion is a blank region uncoated with the second active material layer, and the third portion is located at the inner ring of the battery cell and connected with the second conductive part.

15. The electric apparatus according to claim 14, wherein in the width direction of the first current collector, a width of the third portion is less than a width of the fourth portion.

16. The electric apparatus according to claim 10, wherein in a direction perpendicular to a winding axis of the battery cell, the first conductive part and the second conductive part are disposed side by side in the hollow cell winding space; and a first insulation layer is sandwiched between the first conductive part and the second conductive part.

17. The electric apparatus according to claim 10, wherein cross sections of the first conductive part and the second conductive part are circular, rectangular, elliptical, triangular, or polygonal.

* * * * *